United States Patent [19]

Payne et al.

[11] 4,158,219
[45] Jun. 12, 1979

[54] HETEROPHASIC CERAMIC CAPACITOR

[75] Inventors: David A. Payne, Champaign, Ill.;
Sang M. Park, Newhall, Calif.

[73] Assignee: University of Illinois Foundation, Urbana, Ill.

[21] Appl. No.: 847,588

[22] Filed: Nov. 1, 1977

[51] Int. Cl.² ............................................. H01G 4/12
[52] U.S. Cl. .................................. 361/321; 29/25.42; 106/73.31; 252/520
[58] Field of Search ..................... 361/321; 106/73.31, 106/39.8, DIG. 5; 252/520

[56] References Cited

U.S. PATENT DOCUMENTS

| 2,721,182 | 10/1955 | Clement | 106/DIG. 5 |
|---|---|---|---|
| 3,279,947 | 10/1966 | Kaiser | 106/73.31 X |
| 3,666,505 | 5/1972 | Hoffman | 361/321 X |
| 3,977,887 | 8/1976 | McIntosh | 106/73.31 X |
| 4,027,209 | 5/1977 | Maher, II | 361/321 |
| 4,066,246 | 1/1978 | Maher | 106/39.8 X |

OTHER PUBLICATIONS

Rusinko, "Dielectric Mixing in the PLZT–Pb5 Ge3O11 System," Thesis Penn State College of Earth and Mineral Sciences, 5/75, pp. 3, 5 and 10.

Primary Examiner—Richard R. Kucia
Attorney, Agent, or Firm—Mathew L. Kalinowski

[57] ABSTRACT

Liquid phase sintering of a mixture comprising a major amount of $BaTiO_3$ and a minor amount of $Pb_5Ge_3O_{11}$ at a temperature of 750°–1050° C. provides a heterophasic ceramic body of high dielectric constant and strength, and low dissipation factor. Consequently, relatively inexpensive low melting point metals such as silver and copper can be utilized as electrodes in the fabrication of monolithic multi-layer ceramic capacitors.

9 Claims, 2 Drawing Figures

HETEROPHASIC CERAMIC CAPACITOR

This invention relates to novel ceramic capacitors and to a method of fabricating them. More specifically, this invention relates to $BaTiO_3$-$Pb_5Ge_3O_{11}$ compositions that can be fired at 750°–1050° C. to provide a heterophasic ceramic body of high dielectric strength and low dissipation factor. The relatively low firing temperature permits use of inexpensive, non-noble metals and alloys thereof as electrodes in the fabrication of monolithic multi-layer capacitors.

In modern electronic circuitry where high volumetric efficiency in capacitance is required, miniaturized capacitors based upon high dielectric constant materials are increasingly important. More representative of all high dielectric ceramics is $BaTiO_3$, a material that offers a wide range of applications in the fabrication of monolithic multi-layer ceramic capacitors. Such multi-layer capacitors are well known in the art and comprise alternate layers of a ceramic dielectric and metal electrodes, bonded together in a monolithic structure. Alternate electrodes are connected together at one end of the structure and the other electrodes are connected together at the other end. Usually, the electrodes are connected together by a metal terminal applied to the ends of the structure. In the firing of such structures based upon conventional $BaTiO_3$ ceramics, temperatures of the order of 1300°–1400° C. are required, and at these high temperatures in air expensive electrode systems utilizing the noble metals such as platinum and palladium must be used.

It is therefore an object of this invention to provide a $BaTiO_3$ ceramic composition that can be fired at relatively low temperatures. Another object of this invention is to provide, by liquid phase sintering, a heterophasic $BaTiO_3$-$Pb_5Ge_3O_{11}$ composition of high dielectric strength and low dissipation factor. Still another object is to produce multilayer monolithic ceramic capacitors fabricated in air with inexpensive non-noble metals and alloys thereof. These and other objects will appear in the course of the following description and examples.

SUMMARY OF THE INVENTION

Figure 1:
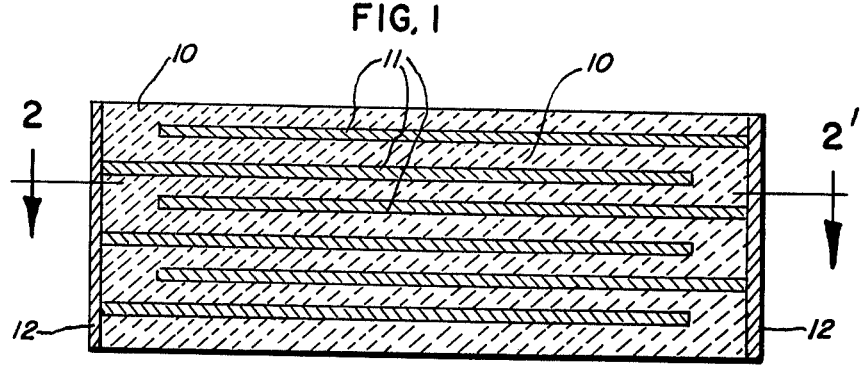
FIG. 1 is a cross-sectional view of the monolithic multi-layer capacitor of this invention having alternate layers of ceramic dielectric 10, staggered electrodes 11, and terminal contact electrodes 12 at each end.
Figure 2:
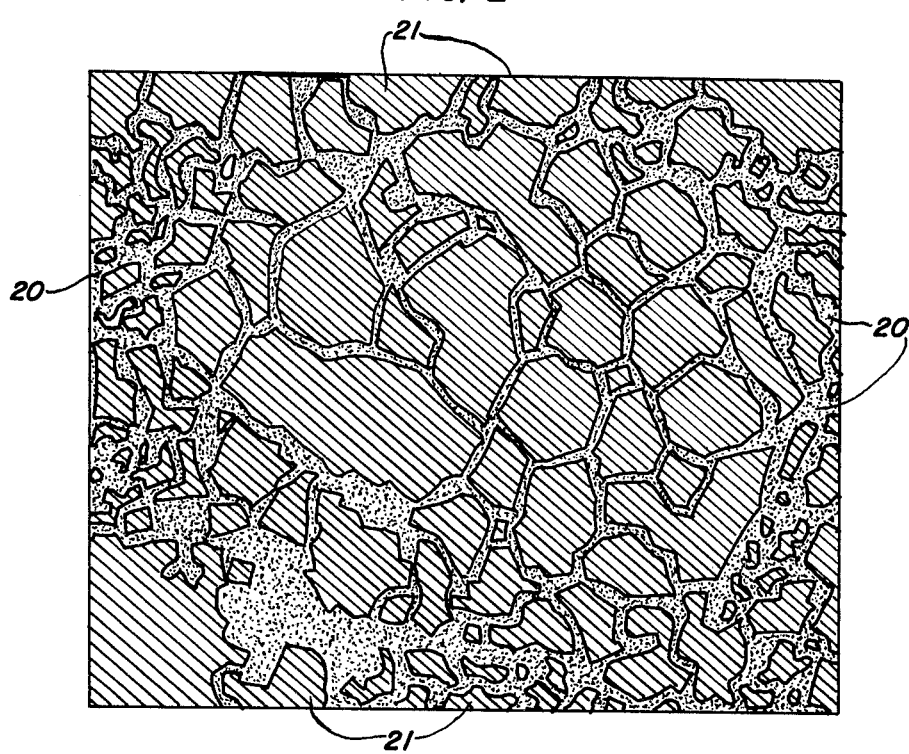
FIG. 2 is a sectional view of the ceramic dielectric of FIG. 1 taken along the axis 2-2'. Illustrated in the heterophasic microstructure of the mature ceramic comprising a continuous $Pb_5Ge_3O_{11}$ derived phase 20 and a discrete $BaTiO_3$ phase 21.

For the practice of this invention, the system $BaTiO_3$-$Pb_5Ge_3O_{11}$ was found to be particularly suitable. For example, $BaTiO_3$ of 1–10$\mu$ particle size is admixed with 1–33 volume % $Pb_5Ge_3O_{11}$; minor amounts of other ceramic materials can be incorporated in the mixture, for example, up to about 25 volume % of one or more of the following: $SrTiO_3$, $CaZrO_3$, $TiO_2$ and the like. After a ceramic body is formed, a metal electrode of silver, copper or nickel for example, is deposited thereon and multiple layers of the combination are stacked and pressed into a monolithic capacitor structure. The green ceramic structure is then fired, usually in air, for 5–60 minutes at a temperature of about 750°–1050° C. Firing of the ceramic structure can also be carried out in controlled atmospheres, for example an atmosphere having a low partial pressure of oxygen. Consolidation occurs by liquid phase sintering to yield a pore-free, heterophasic structure in which a continuous intergranular $Pb_5Ge_3O_{11}$ derived phase separates the major $BaTiO_3$ phase into discrete localized volumes.

In the $BaTiO_3$-$Pb_5Ge_3O_{11}$ system it was found that the degree and rate of densification increased with the amount of liquid phase present. Dielectric constant, however, decreased with increasing amounts of liquid phase. By considering both dielectric and densification characteristics, the preferred amount of liquid phase for rapid sintering at 1000° C. was found to be about 10–15 volume %, which provided a ceramic dielectric having dielectric constant values in the range of about 1000–1500.

DESCRIPTION OF THE PREFERRED EMBODIMENT

The following description and data are presented to illustrate the practice and advantages of the instant invention. The materials used were reagent grade PbO and $GeO_2$, and research grade $BaTiO_3$. $Pb_5Ge_3O_{11}$ was prepared from the melt by reaction of a mixture containing 5 moles PbO and 3 moles $GeO_2$. Reaction was carried out at 750° C. in a platinum crucible until a clear liquid was formed. The synthesized $Pb_5Ge_3O_{11}$ was crushed and powdered in a mortar and pestle, screened through a 325 mesh sieve, and further reduced by ball milling. The final $Pb_5Ge_3O_{11}$ powder had a particle size ranging from 10–30$\mu$ with the highest concentration at 20$\mu$.

The research grade $BaTiO_3$ had an average particle size of 1$\mu$.

For the purpose of measuring electrical properties, $BaTiO_3$ was admixed with 10, 20, and 30 volume % $Pb_5Ge_3O_{11}$. Pellets 1.25 cm in diameter and 0.2 cm thick were prepared in a die by dry pressing at a pressure of 30,000 psi. The pellets were sintered isothermally at 850°, 900°, 950°, 1000°, and 1050° C. for 5 minutes. Quick air-drying silver paste was used to provide electrodes on the surface of the specimens.

Capacitance and dissipation factor were measured over a temperature range of 25°–160° C. Ratings were recorded at 100 KHz. The weak field signal voltage applied across the specimens was 0.5 volt r.m.s.

Table I lists dielectric constants, $K'$, and dissipation factors, $\tan \delta$, for $BaTiO_3$-$Pb_5Ge_3O_{11}$ ceramic compositions containing 10, 20, and 30 volume % $Pb_5Ge_3O_{11}$ sintered at 950° C. These data illustrate that low temperature sintering of the compositions of this invention provides ceramic capacitors possessing excellent electrical characteristics.

TABLE I

Dielectric Measurements on Liquid Phase Sintered $BaTiO_3$ (1 $\mu$) + $Pb_5Ge_3O_{11}$ (X)
$T_s = 950°$ C., $t_s = $ min, 100 KHz

| T(C.°) | X = 10 Vol. % K' | tan δ | X = 20 Vol. % K' | tan δ | X = 30 Vol. % K' | tan δ |
|---|---|---|---|---|---|---|
| 25 | 1210 | 0.012 | 825 | 0.016 | 490 | 0.016 |
| 60 | 1180 | 0.010 | 822 | 0.017 | 495 | 0.015 |
| 70 | 1176 | 0.009 | — | — | — | — |
| 80 | 1205 | 0.009 | 828 | 0.013 | 498 | 0.0156 |
| 90 | 1248 | 0.009 | 841 | 0.014 | — | — |
| 100 | 1302 | 0.009 | 885 | 0.012 | 516 | 0.016 |
| 110 | 1387 | 0.0096 | 950 | 0.014 | 526 | 0.016 |
| 120 | 1440 | 0.0095 | 954 | 0.012 | 544 | 0.016 |
| 130 | 1319 | 0.009 | 911 | 0.011 | 537 | 0.016 |

TABLE I-continued

Dielectric Measurements on Liquid Phase Sintered
$BaTiO_3$ (1 μ) + $Pb_5Ge_3O_{11}$ (X)
$T_S$ = 950° C., $t_S$ = min, 100 KHz

| T(C.°) | X = 10 Vol. % K' | tan δ | X = 20 Vol. % K' | tan δ | X = 30 Vol. % K' | tan δ |
|---|---|---|---|---|---|---|
| 140 | 1193 | 0.010 | 844 | 0.013 | 514 | 0.015 |
| 160 | 1000 | 0.012 | — | — | 467 | 0.020 |

Table II lists dielectric constant and dissipation factor measurements for a $BaTiO_3$-10 volume % $Pb_5Ge_3O_{11}$ composition sintered at temperatures in the range 850°–1050° C. These data illustrate that especially good electrical characteristics are obtained with sintering temperatures at the high end of the range 850°–1050° C. Satisfactory electrical properties, however, are obtained over the entire range of sintering temperatures.

Although this invention has been disclosed in detail with particular reference to certain preferred embodiments thereof, it is understood that variations and modifications can be effected within the spirit and scope of the appended claims. It is intended that all matter contained in the above description and tables or shown in the accompanying drawings shall be interpreted in an illustrative and not in a limiting sense.

TABLE II

Dielectric Measurements on Liquid Phase Sintered
$BaTiO_3$ (1 μ) + 10 Vol. % $Pb_5Ge_3O_{11}$
$t_S$ = 5 min

| T(°C.) | $T_S$ = 850° C. K' | tan δ | $T_S$ = 900° C. K' | tan δ | $T_S$ = 950° C. K' | tan δ | $T_S$ = 1000° C. K' | tan δ | $T_S$ = 1050° C. K' | tan δ |
|---|---|---|---|---|---|---|---|---|---|---|
| 25 | 868 | 0.0125 | 963 | 0.012 | 1210 | 0.012 | 1315 | 0.020 | 1430 | 0.024 |
| 60 | 840 | 0.0085 | 945 | 0.009 | 1180 | 0.010 | 1310 | 0.016 | 1428 | 0.0175 |
| 70 | 858 | 0.009 | — | — | 1176 | 0.009 | 1300 | 0.015 | — | — |
| 80 | 867 | 0.010 | — | — | 1205 | 0.009 | — | — | 1425 | 0.015 |
| 90 | 875 | 0.011 | 986 | 0.01 | 1248 | 0.009 | — | — | 1478 | 0.014 |
| 100 | 881 | 0.011 | 1031 | 0.0103 | 1302 | 0.009 | 1367 | 0.014 | 1575 | 0.015 |
| 110 | 940 | 0.012 | 1114 | 0.0120 | 1387 | 0.0096 | 1475 | 0.014 | 1775 | 0.015 |
| 120 | 983 | 0.0135 | 1157 | 0.0135 | 1440 | 0.0095 | 1566 | 0.015 | 1830 | 0.0143 |
| 130 | 930 | 0.016 | 1075 | 0.015 | 1319 | 0.009 | 1480 | 0.016 | 1682 | 0.013 |
| 140 | 858 | 0.018 | 983 | 0.015 | 1193 | 0.010 | 1350 | 0.013 | 1500 | 0.013 |
| 160 | 738 | 0.023 | 837 | 0.017 | 1000 | 0.012 | 1130 | 0.018 | 1240 | 0.013 |

What is claimed is:

1. A high dielectric constant ceramic capacitor comprising a heterophasic dielectric ceramic body and electrode metal, said heterophasic ceramic body consisting essentially of a major amount of $BaTiO_3$ and from 1–33 volume percent of $Pb_5Ge_3O_{11}$, which mixture matures by liquid phase sintering at a temperature within the range of about 750°–1050° C. and consolidates to yield said heterophasic structure in which a continuous intergranular $Pb_5Ge_3O_{11}$ derived phase separates the major $BaTiO_3$ phase into discrete localized volumes.

2. A monolithic ceramic capacitor in accordance with claim 1 which includes a plurality of layers of said heterophasic ceramic body with said electrode metal deposited thereon, alternate electrode layers being offset from one another to extend to opposite edges of the monolithic capacitor.

3. The ceramic capacitor of claim 2 wherein the $BaTiO_3$ has a particle size within the range of about 1–10μ and the $Pb_5Ge_3O_{11}$ is present in amount of about 5–25 volume %.

4. The ceramic capacitor of claim 2 wherein the electrode metal is a non-noble metal or alloy thereof.

5. The ceramic capacitor of claim 4 wherein the non-noble metal is selected from the group consisting of silver, copper, aluminum, iron, cobalt, and nickel.

6. A method of fabricating a high dielectric, low dissipation factor, monolithic milti-layer ceramic capacitor, characterized by a heterophasic ceramic microstructure, comprising the steps of:
   (a) forming a green ceramic body cosisting essentially of a major amount of $BaTiO_3$ and from 5–25 volume % of $Pb_5Ge_3O_{11}$;
   (b) applying metal electrodes to said green ceramic body;
   (c) stacking a plurality of said ceramic bodies and electrodes in a manner such that alternate electrode layers are offset from one another to extend to opposite edges of the monolithic capacitor; and
   (d) liquid phase sintering said plurality of ceramic bodies and electrodes at a temperature in the range of about 750°–1050° C. to consolidate said green ceramic body to yield said heterophasic structure in which a continuous intergranular $Pb_5Ge_3O_{11}$ derived phase separates the major $BaTiO_3$ phase into discrete localized volumes.

7. The method of claim 6 wherein the $BaTiO_3$ has a partice size within the range of about 1–10μ and the $Pb_5Ge_3O_{11}$ is present in amount of 5–25 volume %.

8. The method of claim 6 wherein the electrode metal is a non-noble metal or alloy thereof.

9. The method of claim 8 wherein the non-noble metal is selected from the group consisting of silver, copper, aluminum, iron, cobalt, and nickel.

* * * * *